US011648164B2

(12) United States Patent
Thaw

(10) Patent No.: US 11,648,164 B2
(45) Date of Patent: May 16, 2023

(54) HYPERBARIC OXYGEN CHAMBER MANUFACTURED UTILIZING ADDITIVE MANUFACTURING

(71) Applicant: Stanley Thaw, Fort Lauderdale, FL (US)

(72) Inventor: Stanley Thaw, Fort Lauderdale, FL (US)

(73) Assignee: Stanley Thaw, Fort Lauderdale, FL (US)

( * ) Notice: Subject to any disclaimer, the term of this patent is extended or adjusted under 35 U.S.C. 154(b) by 0 days.

(21) Appl. No.: 17/367,916

(22) Filed: Jul. 6, 2021

(65) Prior Publication Data

US 2022/0183910 A1 Jun. 16, 2022

Related U.S. Application Data

(60) Provisional application No. 63/019,847, filed on May 4, 2020.

(51) Int. Cl.
*A61G 10/02* (2006.01)
*B33Y 80/00* (2015.01)

(52) U.S. Cl.
CPC ........... *A61G 10/026* (2013.01); *B33Y 80/00* (2014.12); *A61G 2200/10* (2013.01); *A61G 2200/34* (2013.01)

(58) Field of Classification Search
CPC .............. A61G 10/026; A61G 2200/10; A61G 2200/34; B33Y 80/00
See application file for complete search history.

(56) References Cited

U.S. PATENT DOCUMENTS

| 2007/0221225 A1* | 9/2007 | Kutt | A63B 23/18 128/204.23 |
| 2018/0133074 A1* | 5/2018 | Delise | A61G 3/001 |

* cited by examiner

*Primary Examiner* — Rick K Chang
(74) *Attorney, Agent, or Firm* — ArentFox Schiff LLP

(57) ABSTRACT

The present invention relates to an adaptive hyperbaric oxygen chamber designed to function as a medical apparatus in order to treat a subject suffering from any FDA approved medical condition. The hyperbaric oxygen chamber is designed and constructed in such a way that only one subject can be allowed to sit in an upright seated position, unless the pediatric seat is occupied by a pediatric patient and the adult is seated in the standard seat to accompany the pediatric patient. The upright patient seat when treating a pediatric patient is in the extended position while the occupant enters and exits the mono medical hyperbaric oxygen chamber and the seat is returned to the fixed position inside the hyperbaric oxygen chamber while the overhead door is closed, the seat being operated by an extension device. The hyperbaric oxygen chamber is made, using additive manufacturing technology. The hyperbaric oxygen chamber provides two hundred to five hundred liters of one hundred percent oxygen per minute to the pressure vessel. A nitrogen scrubber is connected to a discharge air duct of this hyperbaric oxygen chamber that converts the oxygen being expelled through the air duct to one hundred percent nitrogen.

18 Claims, 4 Drawing Sheets

FIGURE # 1-HYPERBARIC OXYGEN CHAMBER 1050-OPENED
MOVEABLE CHAIR IN REAR- TREATMENT POSITION
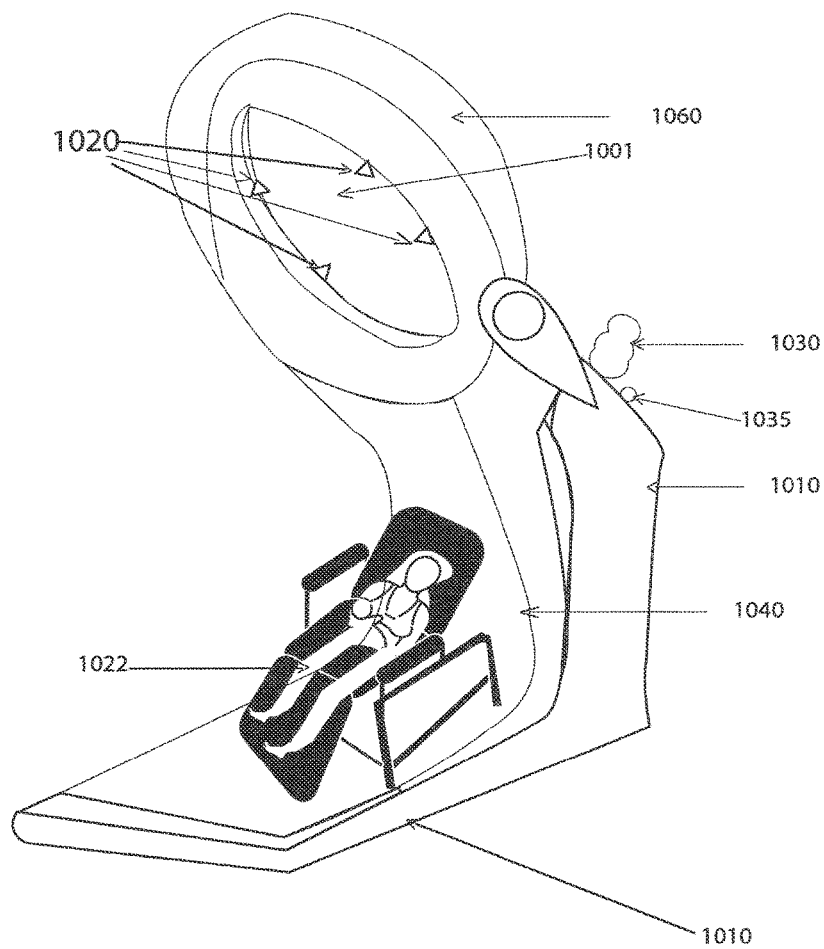

FIGURE # 2-HYPERBARIC OXYGEN CHAMBER 1050-OPENED
MOVEABLE CHAIR IN FRONT POSITION -TO RECIVE PATIENT
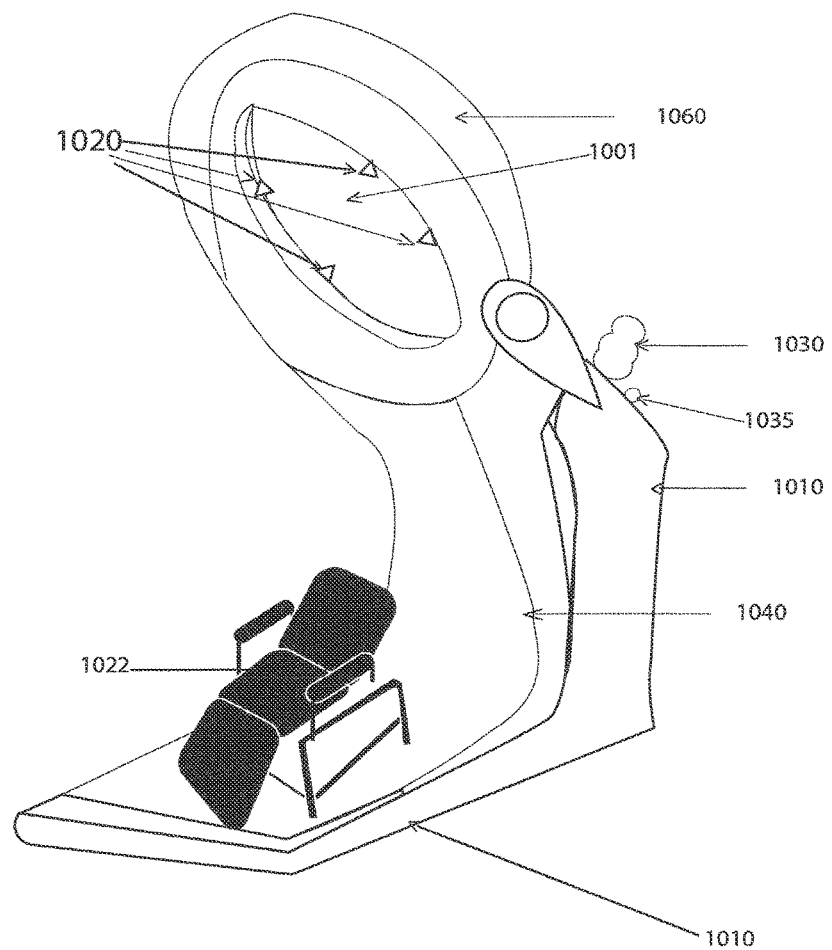

FIGURE # 3-HYPERBARIC OXYGEN CHAMBER 1050-IN CLOSED POSITION
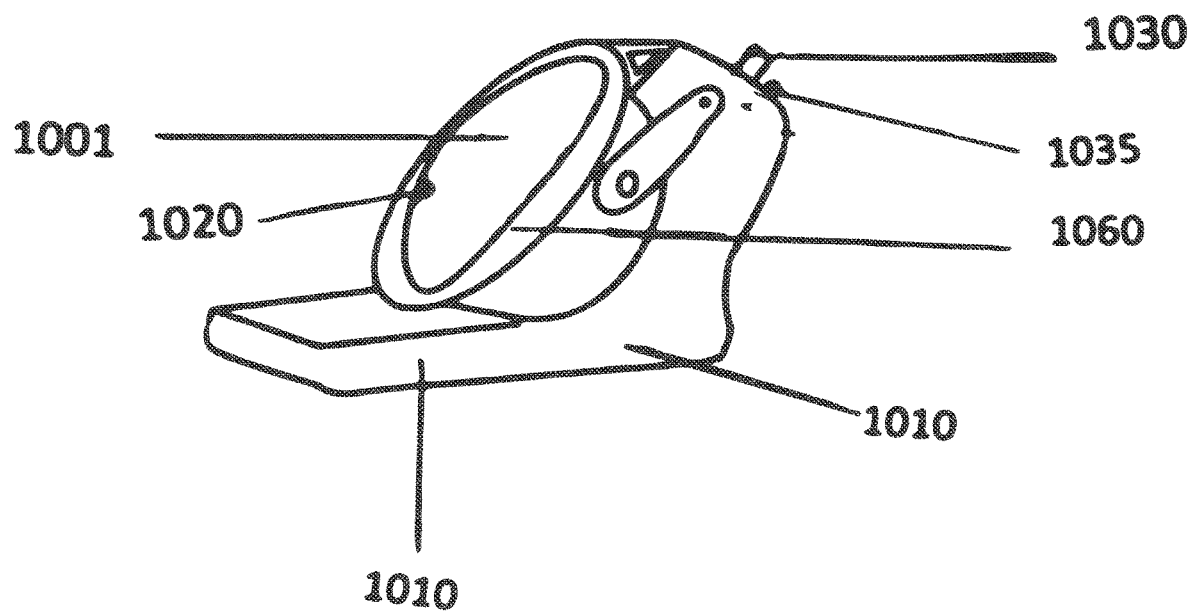

FIGURE #4

CONTROL PANEL CONFIGURATION - DISPLAY ITEMS

| NO | Part Name |
|---|---|
| 1 | Counter |
| 2 | Remote telemetry door locking mechanism |
| 3 | Temperature Indicator |
| 4 | Humidity Indicator |
| 5 | CO2 Indicator |
| 6 | Chamber Pressure |
| 7 | O2 Source Pressure Manometer |
| 8 | Air Source Pressure Manometer |
| 9 | Chamber Pressure |
| 10 | Flowmeter |
| 11 | O2 Analyzer |
| 12 | Patient Warning Reset Button On/Off |
| 13 | Patient Warning Alarm |
| 14 | Door Locked Light |
| 15 | Pressure Inside Light |
| 16 | Set Pressure |
| 17 | TV On/Off |
| 18 | Emergency Stop Button |
| 19 | Intercom |
| 20 | System On/Off Button |
| 21 | Biometric Access Module Indicator |
| 22 | Patient seat Retractable Function Indicator |
| 23 | Pediatric Seat Extension Assembly |

HYPERBARIC OXYGEN CHAMBER MANUFACTURED UTILIZING ADDITIVE MANUFACTURING

TECHNICAL FIELD

The present application generally relates to a hyperbaric oxygen chamber, and more specifically, to a hyperbaric oxygen chamber manufactured utilizing additive manufacturing to provide advantages over other hyperbaric oxygen chambers.

BACKGROUND OF THE INVENTION

This invention relates to chambers for hyperbaric oxygen therapy. Hyperbaric oxygenation is a mode of medical treatment in which the patient is entirely enclosed in a pressure chamber breathing 100% oxygen at a pressure greater than one atmosphere.

Hyperbaric oxygen chambers are generally elongated horizontal cylinders pressurized with 100% oxygen in which a patient must lie down in a prone position, often experiencing the discomfort of claustrophobia and becoming non-compliant whereby not completing the regime of prescribed treatments of their physician which would be needed to achieve the medical benefits of their therapy. Hyperbaric oxygen chambers are required to be cleared by the FDA as Class II medical device based on the standards of a 510K review.

Currently the following list of medical conditions have been approved by the FDA for treatment utilizing hyperbaric oxygen treatments that use between 1 to 6 ATA/s of pressure. Air or Gas Embolism, Acute Traumatic Ischemia, Acute Anemia, Exceptional Blood Loss (Anemia), Intracranial Abscess, Crush Injury, Compartment Syndrome, and other Acute Traumatic Ischemia's, Carbon Monoxide Poisoning, Compromised Skin Grafts or Flaps, Cyanide Poisoning, Decompression Sickness, Gas Gangrene, Necrotizing Soft Tissue Infections, Radiation Effects, Osteomyelitis (Refractory), Non-Healing Wounds, Diabetic Foot Ulcers and Thermal or Extensive Burns, Delayed Radiation Injury (Soft Tissue and Bony Necrosis). These treatments generally last for a period of one hour, not requiring an air-break.

All treatments are performed at a predetermined schedule by a trained and certified Hyperbaric technician who monitors the patient at all times. The hyperbaric technician may not leave the chamber or the patient unattended at any time during the course of the hyperbaric treatment period, usually, one hour in duration.

The typical hyperbaric oxygen chamber used in hyperbaric oxygen therapy is a hard-shelled pressure vessel having an entry hatch for patients along with small viewing ports to allow technicians or medical staff outside the chamber to monitor the patient inside the chamber, and a control panel outside the chamber that functions to control the flow of oxygen and pressure within the chamber. Hyperbaric oxygen chambers are required to always have a communication system between the patient and the certified technician to that they communicate if necessary.

In the larger multi-place chambers, patients inside the chamber breathe from either "oxygen hoods"—flexible, transparent soft plastic hoods with a seal around the neck like a space suit helmet—or tightly fitting oxygen masks, which supply pure oxygen and may be designed to directly exhaust the exhaled gas from the chamber. During treatment patients breathe 100% oxygen most of the time to maximize the effectiveness of their treatment, but have periodic breaks during which the patient may breathe chamber air (21% oxygen) to reduce the risk of oxygen toxicity. The exhaled treatment gas must be removed from the chamber to prevent the build-up of oxygen, which could present a fire risk. Attendants may also breathe oxygen some of the time to reduce their risk of decompression sickness when they leave the chamber. The pressure inside the chamber is increased by opening valves allowing high-pressure air to enter from storage cylinders, which are filled by an air compressor. Chamber air-oxygen content is kept between 19% and 23% to control fire risk (US Navy maximum 25%).

Other hyperbaric oxygen chambers called multi-place hyperbaric oxygen chambers can be run at absolute pressures typically about 6 bars (87 psi), 600,000 Pa or more in special cases. They range in size from semi-portable, one-patient units to room-sized units that can treat eight or more patients. The larger units may be rated for lower pressures if they are not primarily intended for treatment of diving injuries.

A rigid chamber may consist of a pressure vessel with the view ports (windows) made of acrylic and have one or more human entry hatches —small and circular or wheel-in type hatches for patients on gurneys; the entry lock that allows human entry —a separate chamber with two hatches, one to the outside and one to the main chamber, which can be independently pressurized to allow patients to enter or exit the main chamber while it is still pressurized. A low volume medical or service airlock for medicines, instruments, and food; transparent ports or closed-circuit television that allows technicians and medical staff outside the chamber to monitor the patient inside the Chamber; an intercom system allowing two-way communication.

A control panel outside the chamber to open and close valves that control air flow to and from the chamber and regulate oxygen to hoods or masks. The prior art hyperbaric oxygen chambers have an over-pressure relief valve; a built-in breathing system (BIBS) to supply and exhaust treatment gas and a fire suppression system.

Flexible chambers are available ranging from collapsible flexible aramid reinforced chambers which can be disassembled for transport via truck or SUV, with a maximum working pressure of 2 bar above ambient complete with BIBS allowing full oxygen treatment schedules to portable, air inflated "soft" chambers that can operate at between 1.3 and 0.5 bars (4.4 and 7.3 psi) above atmospheric pressure with no supplemental oxygen, and longitudinal zipper closure. These flexible chambers are not cleared by the FDA to provide any medical benefit nor can any of the patient treatments utilizing these flexible chambers be paid for by any medical insurance provider nor Medicare or Medicaid and they are not considered a medical device.

Smaller "Mono-plane" chambers can only accommodate the patient, and no medical staff can enter. The chamber may be pressurized with pure oxygen or compressed air. If pure oxygen is used, no oxygen breathing mask or helmet is needed, but the cost of using pure oxygen is much higher than that of using compressed air. If compressed air is used, then for alert, cooperative patients, air brakes provided by mask are more effective than changing the chamber gas because they provide a quicker gas change and a more reliable gas composition both during the break and treatment periods.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

SUMMARY OF THE INVENTION

The present invention relates to a hyperbaric oxygen chamber therapy device.

BRIEF DESCRIPTION OF THE DRAWINGS

FIG. 1 is a perspective view of an exemplary embodiment of the open hyperbaric oxygen chamber, Showing the location of the patient seating during the use of the hyperbaric oxygen chamber.

FIG. 2 is a perspective view of an exemplary embodiment of the open hyperbaric oxygen chamber, Showing the location where a healthy of an infirmed patient, can have easy access to the moveable chair which will then move to the proper position for the utilization of the hyperbaric oxygen chamber.

FIG. 3 is the perspective view of an exemplary embodiment of the closed hyperbaric oxygen chamber, Showing the location of the patient seating during the use of the hyperbaric oxygen chamber.

FIG. 4 is a chart listing the specific functions which will display on the control panel when the hyperbaric oxygen chamber is being utilized.

As shown in FIG. 1, this Hyperbaric Oxygen chamber 1050 is manufactured utilizing additive manufacturing technology, constructed of any form of matter that meets or exceeds the following regulations: NFPA-99, (FIRE CODE), PVHO-1, (HUMAN OCCUPANCY CODE), ASME (BOILER CODE FOR PRESSURE VESSELS).

Utilization of this new, Additive Manufacturing technology surpasses all previously constructed hyperbaric oxygen chambers 1010 (FIGS. 1-3) because it is constructed with materials such as carbon fiber and Kevlar and other materials that are stronger than steel, less than the comparable weight of steel and can be constructed more rapidly in order to advance this therapy to be used in the offices of physicians who specialize in the treatment of the currently FDA approved conditions or that will become approved medical conditions. This factor will significantly reduce the patient cost compared to the current charges from hospitals in the United States.

Referring to FIGS. 1-3, a hyperbaric oxygen chamber 1010 may be shown. The hyperbaric oxygen chamber 1010 is designed with a retractable overhead access door 1060. This retractable overhead access door 1060 is operated pneumatically from the remote-control panel and includes remote telemetry sensors 1020 (see FIG. 1), that indicate the safe and secure closure with a door locked light 14 indicator which is located on the remote-control panel, which is constantly being monitored by a hyperbaric trained and certified technician. This unique overhead chamber access door 1060 is the largest patient access door than any other hyperbaric oxygen chamber. This design is for the safety of the patient while both entering and exiting the hyperbaric oxygen chamber. This hyperbaric oxygen chamber 1010 includes the largest view port 1001 made of acrylic or other approved clear material.

This hyperbaric oxygen chamber 1010 utilizes a control panel with the functions as listed in FIG. 4, items 1 thru 23. The technician utilizes a patient verification biometric access system. This technology includes, iris scan, palm scan as well as vein scan processes. This system validates approved, trained, and certified personnel to operate the hyperbaric oxygen chamber 1010 as well as verification for the correct patient to be treated. These scans are shown on the display of the control panel, which is located on a desk in the same room.

There are no other multiple biometric scan access systems designed into or coordinating with hyperbaric oxygen chambers at this time. We are solving the previous limitations that exist with unapproved personnel operating a hyperbaric oxygen chamber as well as in cases where the incorrect patient may have been treated with an incorrect protocol. The security of having only the assigned and approved/certified hyperbaric personnel being able to start and operate the medical device as well as having the certainty of the correct patient being treated, adds to the safety and validity of the therapy sessions.

This hyperbaric oxygen chamber 1010 has a seat 1040 designed as shown in FIGS. 1 & 2 for the patient to be seated in a comfortable and vertical position with or without a pediatric assisted assembly which is a pull-out apparatus for a child's therapy. This patient seat has a pneumatic function that moves the seat forward 1040 for the safety and comfort of the patient entering and exiting the hyperbaric oxygen chamber. In addition, this patient seat has a pull-out that is utilized when a pediatric patient might require an adult for security and reassurance during a pediatric session. A need therefore exists for a safe and secure medical device so that an adult is seated in the patient seat which has a pull out from beneath the seat for the comfort of the pediatric patient as well. There are no other hyperbaric oxygen chambers with this valuable feature which will enable extending hyperbaric oxygen therapy to a broader and under-treated number of pediatric patients who need this therapy for numerous FDA approved conditions.

Other hyperbaric oxygen chambers are horizontal where patients are lying down on a gurney and are very restrictive, frequently causing emotional distress and claustrophobia. Patients then become non-compliant to their physician's original orders for the number of prescribed treatments, and become non-compliant and elect to avoid the medical plan of care and not complete their therapy.

Referring to FIG. 1 this hyperbaric oxygen chamber 1010 has a nitrogen scrubbing device 1030. This nitrogen scrubbing device 1030 is designed to exchange the oxygen from the exhaust valve area of the operating hyperbaric oxygen chamber to nitrogen. This exchange nitrogen scrubbing device 1030 uses a filtering mechanism that converts the expelled oxygen to nitrogen so that the existing gas, flows into the ambient room air as nitrogen which is non-flammable and mixes with the 78% of the existing nitrogen portion of air in the treatment room. Significant limitations exist with all other hyperbaric oxygen chambers to function in any medical office. Existing installations require an exit flow apparatus which would need to be installed at the exit wall of a building rather than any interior wall. The exit wall would need to be broken open to accept the exterior gas apparatus which limits the installation of hyperbaric oxygen chambers in most office buildings throughout the United States. This unique technology will expand the utilization of hyperbaric oxygen therapy to a much larger medical audience in a safe atmosphere and without the difficulty of securing special Fire Department approvals. This feature will bring the standard and expensive therapy of approved hyperbaric patient care to local medical practices at reasonable fees not currently available to patients with extremely expensive charges from hospitals.

This hyperbaric oxygen chamber as shown in FIG. 1, four remote telemetry-sensors 1020 affixed to the retractable overhead access door 1060, to ensure a secure closure, which does not exist on any current hyperbaric oxygen chambers. This is both a safety and security feature of the technology.

Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications, and equivalents consistent with the principles and features disclosed. For purposes of clarity, details relating to technical material that is known in the technical fields related to the invention have not been described in detail so as not to unnecessarily obscure the present invention.

In the description and claims of the application, each of the words "comprise," "include" and "have" are forms thereof, are not necessarily limited to members in a list with which the words may be associated.

It should be noted herein that any feature or component described in association with a specific embodiment may be used and implemented with any other embodiment unless clearly indicated otherwise.

In this disclosure, "compromises," "compromising," "containing" and "having" and the like can have the meaning as basic or novel characteristics of that which is recited is not changed by the presence of more than that which is recited but excludes prior are embodiments.

In a particular embodiment of the invention, a hyperbaric oxygen chamber is adapted to function as a medical apparatus to treat a patient from various wounds or to heal various other maladies approved by the FDA. This hyperbaric oxygen chamber includes a unique sealable chamber similar in design to an overhead cabin door 1060 as shown in FIG. 1 in an aircraft. This oversized cabin door 1060 permits both additional patient convenience and safety, with the spacious opening door not being an obstacle as with current hyperbaric oxygen chambers. This hyperbaric oxygen chamber has the largest view-port door design 1001 as shown in FIG. 1 which diminishes the sense of claustrophobia for the patient. The exterior cabin door 1060 operates pneumatically to close and open. The cabin door is sealed with a pressure sealing O ring or other functional gasket assembly to ensure designed closure to maintain internal pressure when in the closed position. The cabin is sized and shaped to accommodate a seated and in an erect and comfortable seated position, a single patient or parent of a child requiring prescribed hyperbaric oxygen therapy. The patient seat assembly 1040 as shown in FIGS. 1 & 2 is adjustable so that when the patient enters the chamber to be seated, the patient chair has been extended to the front of the cabin and the patient is placed in their seat and the seat is pneumatically returned to the stationary and fixed position for their treatment. Should the use of the child apparatus be required, and if the child is of pediatric age, then the parent or adult is in attendance for the security and emotional support of the child, then the child seat section 1022 of the patient chair is removed from underneath the standard patient seating 1040. The use of remote telemetry signals 1020 the proper closure of the overhead cabin door 1060, which will be displayed on the chamber control panel being monitored by the certified technician.

The separate chamber control panel, which is located in the same room as the hyperbaric oxygen chamber 1010, is monitored by the medical personnel. When the hyperbaric oxygen chamber is being utilized, the items as depicted in FIG. 4, will display on the chamber control panel. The chamber control panel monitoring unit is comprised of a flow meter, oxygen supply regulator that includes a plurality of pressure gauges and measures the atmospheric pressure within the chamber. The amount of air exiting the hyperbaric oxygen chamber 1010 is controlled by an outflow control valve. The hyperbaric oxygen chamber 1010 also incorporates a bleed valve for gradually releasing the pressure in the hyperbaric oxygen chamber 1010 and a full release valve for rapidly decreasing the pressure in the hyperbaric oxygen chamber 1010. The hyperbaric oxygen chamber 1010 also incorporates a pair of check valves which prevent the inadvertent rapid decompression of the hyperbaric oxygen chamber 1010 as well as a ventilation outlet which will be located downstream from the check valve, in addition to an oxygen flow meter, an emergency shut-off switch and a use counter. Further, the control panel includes a two-way communication system to be used by the patient and the technician.

The Nitrogen scrubber 1030 is attached to the discharge duct 1035 of the hyperbaric oxygen chamber therapy device as shown in FIG. 1 hyperbaric oxygen chamber 1010—opened. The nitrogen scrubber 1030 is designed so that a hollow fiber separation membrane which admits oxygen, to selectively permeate out of the membrane while the remainder of the oxygen flows inside of the separation membrane. As a result, nitrogen enriched gas can be obtained at the separation outlet. This additional safety technology device removes the danger of the exterior air being filled with excess combustible expelled oxygen as is the case in current hyperbaric oxygen therapy equipment. The nitrogen scrubber 1030 is designed to convert oxygen gas received from the discharge duct to nitrogen gas.

DETAILED DESCRIPTION OF THE INVENTION

The present invention is directed towards multiple embodiments. The following disclosure is provided to enable a person having the required hyperbaric training and certification to administer the oxygen treatments to a patient. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications, and equivalents consistent with the principles and features disclosed. For purposes of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated.

It should be noted herein that any feature or component described in association with a specific embodiment may be used and implemented with any other embodiment unless clearly indicated otherwise.

In this disclosure, "comprises," "comprising," "containing" and "having" and the like can have the meaning as basic or novel characteristics of that which is recited is not changed by the presence of more than that which is recited but excludes prior art embodiments.

In a particular embodiment of the invention, a hyperbaric oxygen chamber 1010 is adapted to function as a medical apparatus in order to treat a subject suffering from any approved condition indicated by the FDA, governing body.

The hyperbaric oxygen chamber 1010 is designed and erected in such a way that only one subject can be allowed to sit in an upright seated position, unless in the situation where a parent is seated with a child for emotional security and safety during the hyperbaric treatment. This positioning allows the subject to inhale maximum usage of oxygen in a predefined amount of time. The ergonomics of the hyperbaric oxygen chamber 1010 allows for the comfortable seating for patients so that they do not experience any sort of discomfort during the treatment.

Additionally, it is pertinent to note that the Hyperbaric oxygen chamber is designed to function with patients of varying height and weight, wherein the height could range up to seven feet and weight of around one hundred and eighty kilograms. Pediatric patients can be accompanied by an adult while being seated in the pull-out apparatus of the patient chair. The seated cushion is made of medical grade rubber or foam.

In an embodiment only one hundred percent of oxygen in pure gaseous form is used. The pure gaseous form of oxygen is used to pressurize a vessel in the hyperbaric oxygen chamber.

It is pertinent to note that in the hyperbaric oxygen chamber, the oxygen is not in liquid form.

In another embodiment, the hyperbaric oxygen chamber is constructed using additive manufacturing products and methods. One of the additive manufacturing methods used could be 3D/4D printing technology.

Additive manufacturing primarily known as 3D printing is used in industrial production to enable the creation of lighter, stronger parts and systems.

Herein, additive manufacturing uses data computer-aided design (CAD) software 3D/4D or other forms of additive manufacturing formats. This technology utilizes scanners to direct hardware to deposit material, layer upon layer, in precise geometric shapes. Typically, additive manufacturing adds material to create an object.

In an embodiment, the Hyperbaric oxygen chamber is made up of either plastic components or metal components or a combination of both based specifically on the additive manufacturing technology. These plastic components and metal components or other materials used in additive manufacturing are designed to be utilized in a specific format designed for additive manufacturing that conform to the safety and functionality standards for the pressure vessel medical industry.

It is pertinent to note that in reference to the embodiment, that only certain intravenous lines and ventilation ducts can be used to penetrate through a hull of the pressure vessel, since the hyperbaric oxygen chamber is fully designed to provide oxygen therapy to utilize a specific pressure profile for the patient.

Functioning of the Hyperbaric Oxygen Chamber

The hyperbaric oxygen chamber includes basic controls to monitor and supervise the functioning of the hyperbaric oxygen chamber.

The hyperbaric oxygen chamber comprises a series of manual gas valves that allow a trained operator to control input pressure ventilation and exhaust.

Further, the hyperbaric oxygen chamber requires one hundred percent oxygen in order to maintain a desired pressure while simultaneously adapted to provide adequate ventilation and control the mixture of carbon dioxide, water vapor and patient cooling gases.

In a preferred embodiment, the hyperbaric oxygen chamber provides two hundred-five hundred liters of one hundred percentage oxygen per minute to the pressure vessel.

In another preferred embodiment, a nitrogen scrubber 1030 is connected to a discharge air duct of a hyperbaric oxygen chamber that converts the oxygen being expelled through the air duct to one hundred percent nitrogen into the ambient air atmosphere.

The nitrogen scrubber 1030 is primarily used to control gaseous emissions.

Additionally, a complete control and monitoring system (see FIG. 4), is used to monitor oxygen flow and consumption. This monitoring system includes multiple duplex pressure gauges as well as reinforced flow control valves. There inforced flow control valves use a forced balanced volume amplifier adapter to supply gas to the exhaust, located at the nitrogen scrubber 1030.

The hyperbaric oxygen chamber utilizes an independent pressure time recorder and a precise pressure control. The functionality could also be performed through flow control check valves supplied with static preference or set pressures.

In an embodiment, standard ventilation circuits, flow controllers, valve types and sizes, volume gas compositions and pressures, then those disclosed herein, may be employed and that unique features provided by the design, technology are not limited in their expression to the embodiment thereof. It should be understood that other embodiments may fall within the spirit and scope of this invention.

In an embodiment, the hyperbaric oxygen chamber is used to treat; Air or Gas Embolism, Carbon Monoxide Poisoning, Diabetic Foot Ulcers, Exceptional Blood Loss, Intracranial Abscess, Gas Gangrene, Crush Injury, Compartment Syndrome, other Acute Traumatic Ischemia's, Decompression Sickness, Necrotizing Soft Tissue Infections, Osteomyelitis (Refractory), Delayed Radiation Injury (Soft Tissue and Bone Necrosis), Skin Grafts and Flaps, (Compromised), Thermal Burns, Actinomycosis, Cyanide Poisoning, Delayed Radiation Injury, (Soft tissue and bony necrosis).

The hyperbaric oxygen chamber provides oxygen therapy to diminish the size of the bubbles, not simply through pressure, but also by using an oxygen gradient.

In an embodiment, the hyperbaric oxygen chamber can be of rigid or flexible construction along with a means of delivery of one hundred percent gaseous oxygen. The operation is performed to a predetermined schedule by trained personnel who monitor the patient and may adjust the schedule as required.

In an exemplary embodiment, the hyperbaric oxygen chamber 1010 is a rigid shelled pressure vessel.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

What is claimed is:

1. A hyperbaric oxygen chamber therapy medical device, comprising:
   a. a sealable chamber sized and shaped to accommodate a seated whole body of a subject, wherein the subject is seated in an upright position in a perpendicular manner within the sealable chamber;
   b. a monitoring unit control panel which displays an oxygen supply regulator, a plurality of pressure gauges, an oxygen flow meter, an emergency shut-off switch, and a use counter, wherein the monitoring unit control panel includes a communication device used between a hyperbaric technician operating the device and the subject seated within the sealable chamber; and
   c. a nitrogen scrubber connected to a discharge duct of the hyperbaric oxygen chamber therapy medical device, wherein the nitrogen scrubber is designed to convert oxygen gas received from the discharge duct into nitrogen gas.

2. The device as claimed in claim 1, wherein the sealable chamber is sealed by an overhead door.

3. The device as claimed in claim 2, wherein the overhead door is made of material comprising of plastic components and metal components or other components that are formed by utilizing additive manufacturing technology.

4. The device as claimed in claim 1, wherein the sealable chamber is wide enough to hold one adult or an adult with a pediatric patient.

5. The device as claimed in claim 2, wherein the overhead enclosure is held closed by a pressure exerted within the sealable chamber.

6. The device as claimed in claim 1, further comprising at least one pressure sensor within the sealable chamber, that at least one pressure sensor communicating with the control panel to allow the monitoring unit to determine one or more pressure conditions within the sealable chamber.

7. The device as claimed in claim 1, wherein the sealable chamber is manufactured using additive manufacturing processes.

8. The device as claimed in claim 1, wherein the sealable chamber is made of carbon fibers, kevlar, or other like materials utilizing additive manufacturing and that meet the criteria of the FDA standards for a hyperbaric oxygen chamber.

9. The device as claimed in claim 1, wherein the nitrogen scrubber comprises a hollow fiber member to convert the flow of oxygen gas into nitrogen gas.

10. The device as claimed in claim 1, wherein the nitrogen scrubber expels the nitrogen gas into ambient air.

11. The device as claimed in claim 1, wherein the device of a rigid construction.

12. The device as claimed in claim 1, wherein the device is adapted to deliver one hundred percent gaseous oxygen.

13. The device as claimed in claim 1, comprising an independent pressure time recorder and a pressure control circuit coupled to the monitoring unit control panel.

14. The device as claimed in claim 1, wherein the nitrogen scrubber is adapted to control gaseous emissions out of the device.

15. The device as claimed in claim 1, comprising at least one or more controls to have the device function with a medical standard monitoring system to monitor/supervise the functioning of the device.

16. A hyperbaric oxygen chamber therapy device, comprising:
   a. a sealable chamber sized and shaped to accommodate a seated whole body of a patient and or an adult accompanying a pediatric patient, wherein the subject is seated in an upright position in a perpendicular manner within the sealable chamber;
   b. a monitoring unit comprising an oxygen supply regulator, a plurality of pressure gauges, an oxygen flow meter, an emergency shut-off switch and a use counter;
   c. a nitrogen scrubber connected to a discharge duct of the hyperbaric oxygen chamber therapy device, wherein the nitrogen scrubber is adapted to convert oxygen gas received from the discharge duct into nitrogen gas; and
   d. wherein the hyperbaric oxygen chamber therapy device is manufactured using additive manufacturing technology.

17. A hyperbaric oxygen chamber therapy device, comprising:
   a. a sealable chamber sized and shaped to accommodate a seated whole body of a subject, wherein the subject is seated in an upright position in a perpendicular manner within the sealable chamber;
   b. a monitoring unit comprising an oxygen supply regulator, a plurality of pressure gauges, an oxygen flow meter, an emergency shut-off switch, and a use counter;
   c. a nitrogen scrubber connected to a discharge duct of the hyperbaric oxygen chamber therapy device, wherein the nitrogen scrubber will convert oxygen gas received from the discharge duct into nitrogen gas;
   d. wherein the hyperbaric oxygen chamber therapy device is manufactured using additive materials using additive manufacturing;
   e. wherein the hyperbaric oxygen chamber therapy device utilizes an independent pressure time recorder and a pressure control circuit.

18. The device as claimed in claim 1, wherein the hyperbaric technician and the subject are verified via a patient verification biometric access system.

* * * * *